United States Patent Office 3,051,749
Patented Aug. 28, 1962

3,051,749
METHOD FOR THE OXIDATION OF OLEFINS
Francis E. Lawlor, Wyndmoor, Pa., and Anthony Truchan, Skaneateles, N.Y., assignors to Pennsalt Chemicals Corporation, Philadelphia, Pa., a corporation of Pennsylvania
No Drawing. Filed May 8, 1958, Ser. No. 733,829
8 Claims. (Cl. 260—539)

This invention relates to a method for the oxidation of olefins, and more particularly provides a novel synthesis for certain halogenated olefinic acids.

It is a principal object of this invention to provide a novel method for the oxidation of chloro- and fluoropropenes.

It is an other object of this invention to provide a novel synthesis of chloro- and fluoro-substituted olefinic acids and derivatives thereof.

It is a further object of this invention to provide a novel method for the synthesis of chloro- and fluoro-substituted olefinic acids from halogenated olefins.

Another object of this invention is to provide a novel method for the conversion of chloro- and fluoro-substituted perhalogenated propenes to olefinic carboxylic acids.

A specific object of this invention is to provide a novel method for the synthesis of trichloroacrylic acid.

These and other objects of the invention will be apparent from a consideration of the following specification and claims.

In accordance with this invention, halogenated acids are synthesized by a method which comprises contacting with sulphur trioxide, a compound of the formula $CX_2:CXCX_3$ where each X is a halogen atom having an atomic weight of below 40, that is, each X is chlorine or fluorine.

It has been known hitherto to oxidize certain halogenated olefins of the above formula, for example, with potassium permanganate in caustic solution, to obtain a saturated halogenated acid containing 1 less carbon atom than the starting material, the reaction proceeding by a cleavage of the double bond.

We have now made the surprising discovery that, on oxidation of such halogenated olefins with sulphur trioxide, as further described hereinbelow, the olefinic double bond is not attacked; and there is rather produced as the product of the reaction, the corresponding halogenated olefinic carbonyl compound wherein the terminal trihalomethyl radical has been oxidized. When the reaction mixture is subsequently hydrolyzed to isolate the product, there is obtained a trihaloacrylic compound, containing the radical

which is the acid, $CX_2:CXCOOH$, a salt thereof, or the corresponding acid anhydride, depending on the mode of procedure used in the hydrolysis step.

In the above formula for the presently useful starting materials, $CX_2:CXCX_3$, each of the individual halogen substituents represented by X may be either Cl or F, and the halogen substituents of the olefin may be all of the same nature, or may be mixed. The terminal trihalomethyl radical which is oxidized by the process of the invention may be a trifluoromethyl radical, a trichloromethyl radical, or a chlorofluoromethyl radical. Exemplary of the presently useful halogenated olefinic starting materials are hexachloropropylene, hexafluoropropylene, 1,1,2-trichloro-3,3,3-trifluoropropene, 3,3,3-trichloro-1,1,2-trifluoropropene, 1,1-dichlorotetrafluoropropene, tetrachloro-1,2-difluoropropene, and the like.

The sulphur trioxide used may be gaseous, liquid or solid. It is preferably liquid, and is advantageously the so-called stabilized sulphur trioxide, that is, liquid sulphur trioxide containing an additive, such as boric oxide, inhibiting the spontaneous isomerization thereof into a form solid at room temperature.

In carrying out the present process, the halogenated alkene is simply contacted with sulphur trioxide until oxidation occurs. The molar ratio of sulphur trioxide to halogenated olefin is preferably at least about 2:1, and advantageously, the molar ratio is at least about 4:1. Molar ratios of sulphur trioxide to halogenated olefin up to about 10:1 may be employed if desired. The temperature of the reaction may vary within wide limits, provided that it remains below the decomposition temperature of the reaction mixture components. Depending on the choice of reactants and other factors, the reaction may proceed with evolution of heat, requiring cooling for control thereof, or may proceed at a desirable rate only at elevated temperatures. Thus, for example, temperatures of from about —10° C. to 175° C. may be employed. Superatmospheric pressures, up to about 150 atmospheres, may be applied to the reaction if desired; conveniently, superatmospheric pressures are employed to avoid loss of the volatile reactants when heat is applied in conducting the reaction of the invention. Moderate pressures, that is from 1 up to about 20 atmospheres, are usually preferred. In many instances, the present reaction can be carried out with facility at atmospheric pressure; subatmospheric pressures are also operable, but usually offer no advantages. Solvents and diluents are generally unnecessary in the present process, but if desired, diluents inert to the present reactants, such as concentrated sulphuric acid, dimethylsulfone, dimethylsulfoxide, sulfur dioxide, pyrosulfuryl chloride, and the like, may be added to the reaction mixture. Preferably anhydrous conditions are maintained during the reaction. Catalysts are not required for the reaction but, if desired, may be employed; exemplary of presently useful catalysts are mercuric and mercurous sulphates, aluminum chloride, and the like.

The time of reaction varies, depending on factors such as temperature, the reactivity of the halogenated olefin, the presence or absence of catalysts, and the like, and may range from less than a minute to several hours.

The nature of the immediate products in the present reaction is not fully understood. However, it has been established that the present reaction produces oxidation products which can be converted in a subsequent hydrolysis step to halogenated unsaturated acids or anhydrides, depending on the mode of conducting the hydrolysis.

In accordance with a preferred embodiment of this invention, in the hydrolysis step, the product of the reaction of sulphur trioxide and the halogenated alkene starting material is drowned in water. By the term "drowned" is meant that the reaction mixture is mixed with a quantity of water which is much greater than that of the reaction mixture. For example, ratios on the order of 5 to 10 times by volume of water to reaction mixture are preferably used; however, the process is not so limited, and if desired, amounts of from a volume of water about equal to the volume of reaction mixture up to 50 times the volume of the reaction mixture may be employed. By the use of such quantities of water in the hydrolysis step, the perhalogenated olefinic acid of formula $CX_2:CXCOOH$, where X is as defined above, is obtained as the product.

To obtain the anhydride, $(CX_2:CXCO)_2O$, as the product of the present process, the hydrolysis step is conducted with the introduction of a controlled amount of water. Conveniently, the hydrolysis is accomplished by adding a concentrated mineral acid to the haloalkene-$SO_3$ reaction product. By a concentrated mineral acid is here meant a mixture of a mineral acid with from about 2% to about 20% by weight of water. Advantageously, concentrated sulphuric acid is employed as the mineral acid vehicle for introduction of the water. The concentrated acid is added to the reaction product in amount just sufficient to supply the quantity of water required to produce the anhydride. In general, the anhydride is obtained from the reaction product when the amount of water added is within the range up to about one mole per mole of $SO_3$ introduced into the reaction mixture.

In carrying out the hydrolysis in accordance with this invention, the product of the reaction of the halogenated alkene and sulphur trioxide is simply contacted with the hydrolyzing agent until hydrolysis has occurred. The proportion of hydrolyzing agent to the reaction mixture, as explained above, is determined by the product desired, whether it be the acid or the anhydride. Preferably, to avoid violent decomposition, the temperature of the reactants is controlled during the hydrolysis step to maintain the hydrolysis reaction mixture at about room temperature or below. Thus, for example, for the production of the acid, ice or a mixtuure of ice and water is conveniently employed as the hydrolyzing agent. However, it is not excluded to operate at higher temperatures, for example, up to the boiling point of water if desired. Pressure variation generally offers no advantage in this step, and the hydrolysis is conveniently conducted at atmospheric pressure.

The hydrolysis may be facilitated by the addition of an acid or base. Thus, as pointed out above, for the controlled hydrolysis of the presently produced reaction mixtures to give the corresponding olefinic acid anhydride, a concentrated mineral acid is advantageously employed as the hydrolyzing reagent. A dilute aqueous solution of a mineral acid may be employed in hydrolysis of the presently afforded reaction products to the acid, if desired. On the substitution of an aqueous solution of a base for water, when the hydrolysis is carried out with amounts of hydrolyzing agent in excess of that required to form the anhydride, it will be evident that there will be produced, instead of the acid, the salt of the acid corresponding to the cation of the base. Thus, for example, by use of an aqueous solution of sodium hydroxide, the sodium salt of the halogenated olefinic acid product is obtained. Sodium bicarbonate, potassium hydroxide, lime and similar bases may be employed similarly to produce the corresponding salts. When such aqueous basic solutions are employed for hydrolysis, there are preferably used solutions containing, for example, concentrations on the order of from 5% to 50%, by weight, of base. The amount of base in the aqueous solution should in this case be at least the stoichiometric equivalent of the quantity of halogen removed from the haloalkane and of sulphur trioxide introduced in the initial step, and may, if desired, be in excess, for example, up to 2 or more times the stoichiometric equivalent.

Instead of the above-described procedure, the hydrolysis to the acid or its salt may if desired be conducted in two steps. In the first step, the reaction mixture is mixed with a concentrated mineral acid, as described for formation of the anhydride. The organic layer is then separated and hydrolyzed with water or an aqueous solution of an acid or base, as described above. By proceeding in this fashion, most of the $SO_3$ is separated from the reaction product prior to the hydrolysis. The necessity for removal of the heat of reaction of $SO_3$ with water is thus obviated. In formation of the acid salt, there is the additional economic advantage that consumption of base in neutralization of the $SO_3$ is avoided.

Subsequent isolation of the acid, salt, or anhydride product is accomplished by usual procedures, as by extraction, distillation, or the like.

The invention is further illustrated but not limited by the following examples:

*Example 1*

To 1 mole of hexachloropropylene, in a flask fitted with a stirrer, thermometer and dropping funnel, are gradually added, over a period of 45 minutes, 2.1 moles of stabilized liquid sulphur trioxide, while the reaction mixture is cooled to control the exothermic reaction. The reaction mixture is then poured onto ice and the resulting aqueous solution extracted with two 200 ml. portions of chloroform. Evaporation of the chloroform extract yields crude trichloroacrylic acid; for purification, the crude acid is dissolved in excess aqueous sodium hydroxide and the basic solution extracted with chloroform to remove nonacidic organic components. The aqueous phase is separated, acidified with hydrochloric acid solution, chilled in ice water, and filtered. The yield of air-dried, crystallized trichloroacrylic acid is 58 grams; extraction of the mother liquor with chloroform gives an additional 10 grams of the acid.

*Example 2*

A 100 ml. autoclave charged with 0.10 mole of 1,1,2-trichloro-3,3,3-trifluoropropene and 0.40 mole of liquid sulphur trioxide is heated at 100° C. for 4 hours. The autoclave is cooled to room temperature and the reaction product poured on ice. Extraction of the resulting water solution with ether and evaporation of the ether extract gives as the product trichloroacrylic acid, M. 76–77° C., neutral equivalent 175.5, in a yield of 86%.

*Example 3*

By a procedure as described in Example 2, 0.010 mole of hexafluoropropylene is reacted with 0.45 mole of sulphur trioxide, yielding trifluoroacrylic acid.

*Example 4*

Sulphur trioxide, 0.40 mole, and 0.10 mole of 1,1,2-trichloro-3,3,3-trifluoropropene are heated in an autoclave at 100° C. for 4 hours. To the reaction mixture, cooled to room temperature, 90% sulphuric acid is gradually added until 0.20 mole of water have been introduced. Fractional distillation of the resulting reaction product yields trichloroacrylic acid anhydride.

While the invention has been described herein with reference to various particularly preferred embodiments thereof, it will be appreciated that variations and modifications can be made within the scope of the invention.

What is claimed is:

1. The method of producing a perhalogenated olefinic acid compound selected from the group consisting of anhydrides and carboxylic acids containing the radical $CX_2:CXCO—$ which comprises the steps of contacting with sulphur trioxide a halogenated olefin of the formula $CX_2:CXCX_3$, where each X represents a halogen atom having an atomic weight of below 40, and hydrolyzing the resulting reaction product.

2. The method of forming a perhalogenated olefinic acid of the formula $CX_2:CXCOOH$, where each X represents a halogen atom having an atomic weight of below 40, which comprises contacting with sulphur trioxide a halogenated olefin of the formula $CX_2:CXCX_3$ and hydrolyzing the resulting reaction product.

3. The method of producing a perhalogenated olefinic acid anhydride of the formula $(CX_2:CXCO)_2O$, which comprises contacting with sulphur trioxide a halogenated olefin of the formula $CX_2:CXCX_3$, where each X represents a halogen atom having an atomic weight of below 40, and hydrolyzing the resulting reaction product with an amount of water sufficient to form said anhydride.

4. The method of claim 1, wherein the molar ratio of sulphur trioxide to the said halogenated olefin is about 4:1.

5. The method which comprises contacting with sulphur trioxide, an olefin selected from the class consisting of 1,1,2-trichloro-3,3,3-trifluoropropene and hexachloropropylene, hydrolyzing the resulting reaction product, and isolating trichloroacrylic acid.

6. The method which comprises contacting hexachloropropylene with liquid sulphur trioxide, hydrolyzing the resulting reaction product with water, and isolating trichloroacrylic acid from the hydrolyzed reaction product.

7. The method which comprises contacting 1,1,2-trichloro-3,3,3-trifluoropropene with sulphur trioxide, hydrolyzing the resulting reaction product with water, and isolating trichloroacrylic acid from the hydrolyzed reaction product.

8. The method which comprises contacting hexafluoropropylene with liquid sulphur trioxide, hydrolyzing the resulting reaction product with water, and isolating trifluoroacrylic acid from the hydrolyzed reaction product.

References Cited in the file of this patent
UNITED STATES PATENTS

| | | |
|---|---|---|
| 2,590,124 | Reeder | Mar. 25, 1952 |
| 2,761,875 | Stoner | Sept. 4, 1956 |